Nov. 23, 1965  H. STÖCKER  3,219,123
AIRFOIL CONSTRUCTION AND METHOD OF MAKING AN AIRFOIL
Filed March 17, 1964  2 Sheets-Sheet 1
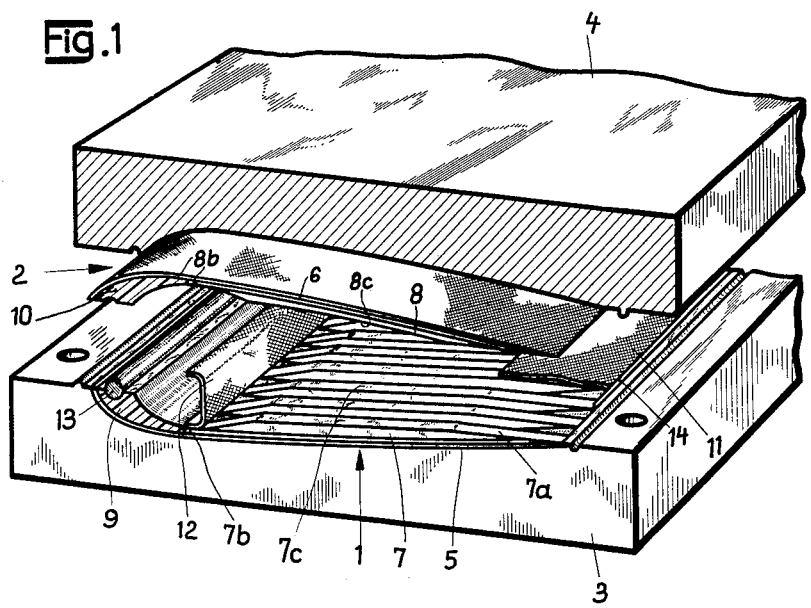
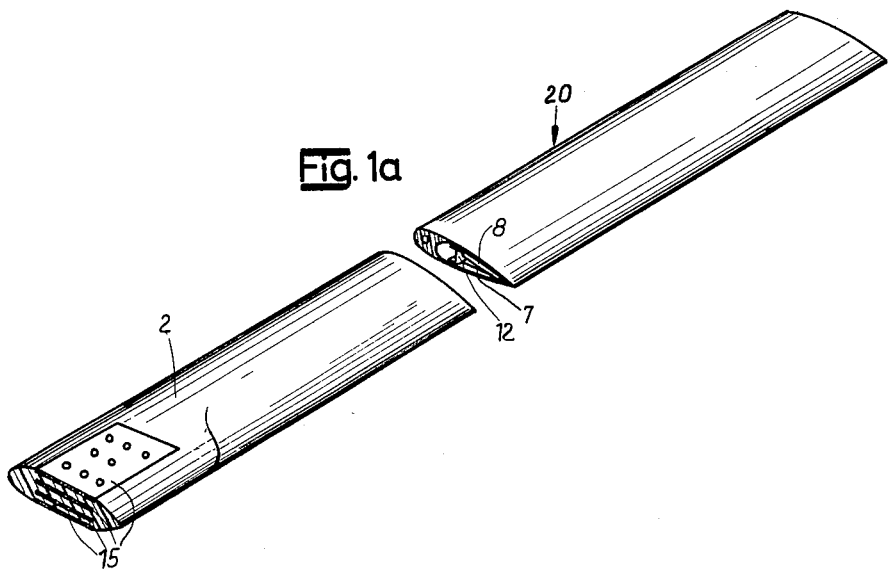
INVENTOR
Horst Stöcker
By *McGlew and Toren*
ATTORNEYS Nov. 23, 1965   H. STÖCKER   3,219,123
AIRFOIL CONSTRUCTION AND METHOD OF MAKING AN AIRFOIL
Filed March 17, 1964   2 Sheets-Sheet 2

INVENTOR
Horst Stöcker

By

ATTORNEYS

United States Patent Office 3,219,123
Patented Nov. 23, 1965

3,219,123
AIRFOIL CONSTRUCTION AND METHOD OF MAKING AN AIRFOIL
Horst Stöcker, Ottobrunn, near Munich, Germany, assignor to Bölkow Gesellschaft mit beschränkter Haftung, Ottobrunn, near Munich, Germany
Filed Mar. 17, 1964, Ser. No. 352,592
Claims priority, application Germany, Mar. 29, 1963, B 71,343
8 Claims. (Cl. 170—159)

This invention relates in general to airfoil construction and method of making an airfoil, and in particular to a new and useful rotor blade, particularly for a rotary aircraft formed with rigid structural elements and plastic material, and to a method of making such a blade.

The invention is particularly applicable in respect to the construction of rotor blades for rotary airfoil systems. For such systems the rotor blades include a rigid leading edge portion and an adjoining rear structure with cover plates thereover forming the outer skin of the profile. In most instances corrugated stiffening elements extending in the longitudinal direction of the blade are secured on the outer skin. The construction is such that the blades have a relatively high blade weight and poor bending characteristics of the skin. In addition, the trailing or rearward structure of such rotor blades has relatively limited torsion and buckling resistance.

In accordance with the present invention, there is provided a construction which includes an interior stiffening element forming the rear or trailing portion of the airfoil section which has a multiplicity of longitudinally spaced and transversely extending corrugated formations providing structural rigidity. The construction advantageously includes a pair of opposed stiffening elements of this character which are bonded together by means of plastic reinforced with fibrous rovings or strands, and the forward portion of the weight of the airfoil structure is built-up with the plastic and fibrous rovings in this manner. With a construction of this nature, the disadvantages of the prior art, particularly in respect to the trailing or rear portion of the blade, are overcome by providing corrugated stiffening elements with the corrugations extending transverse to the longitudinal axis of the blade to form supporting and connecting surfaces for the outer skin. This provides a relatively low weight airfoil structure having relatively good bending qualities but capable of resisting torsion and buckling. By making the reinforcing stiffening structure of the trailing portion of the airfoil section with substantially rectangular stiffening elements, a very high bending stiffness in the blade depth is achieved.

A further feature of the invention resides in the arrangement of the supporting surfaces of the stiffening structures. The two stiffening structures include flat surfaces arranged in opposed relationship and lying in a plane extending substantially through the symmetry axis of the profile section. This arrangement of the supporting surfaces provides a frame-like structure of the blade which provides advantageous stiffness. In addition, the torsion resistance is also increased by the connection of the stiffening elements.

In order to achieve a good distribution of the forces acting on the blade into the outer skin of the airfoil section, the stiffening element is provided with an additional connecting surface on its side facing the leading edge portion of the blade which bears on the outer skin which extends over the entire length of the stiffening element.

A rotor blade constructed in accordance with the invention may be made of various materials, for example, the leading edge portion may advantageously be made of a metallic girder of any form on which the rear structure formed of a similar metallic outer skin is secured by riveting, welding, cementing, etc. The corrugated stiffening elements are made, for example, of a light metal plate and riveted or cemented on the outer skin. A simple and inexpensive rotor blade which is particularly light in weight and easy to manufacture with a high surface quality and profile accuracy can be obtained according to another feature of the invention by the use of glass fiber reinforced plastics.

A further feature of the invention is the method of manufacturing the blade structure. In accordance with a preferred method, the blade structure is made in a mold which advantageously includes two mold parts into which are positioned a glass fiber fabric layer, which is saturated with synthetic resin and forms the outer skin of the blade. The fibers of such a layer are advantageously oriented to extend at an angle of 45° in a crossing manner in respect to the longitudinal axis of the blade. The fiber is positioned in one half of the mold part in a length corresponding to the blade length and this mold portion corresponds to one half of the blade profile which is to be formed.

The method involves the additional step of positioning a stiffening element on each of the fabric layers which are placed in the mold parts. The stiffening element corresponds in length to the blade length and is of a profile selected for particular blade configuration, and is preferably in a shape having corrugations extending perpendicular to the longitudinal center line of the blade structure. An additional structural element for interconnecting the upper and lower forward edges of the reinforcing or stiffening elements is positioned in the molds, and glass fiber rovings saturated with synthetic resin are then arranged to form the leading edge portion of the blade and to cover the structural elements and bond them together. A separate glass fiber fabric band saturated with synthetic resin is arranged at the trailing edges of the stiffening elements for insuring the connection of these elements together when the blade is molded. The two mold halves are then joined together and molded under pressure and hardened to form the finished blade structure.

Accordingly, it is an object of this invention to provide an improved rotor blade construction having stiffening elements which extend transversely to the longitudinal axis of the blade.

A further object of the invention is to provide a rotor blade construction having stiffening elements forming at least the trailing portion of the blade structure, which stiffening elements have corrugations arranged transverse to the longitudinal axis of the blade, the blade structure further including plastic roving bands encircling the stiffening elements and bonded thereto.

A further object of the invention is to provide a wing structure which includes stiffening elements which are bonded to outer rovings of glass fiber materials and which include corrugations extending perpendicular to the longitudinal center line of a resultant airfoil structure, said stiffening elements being connected by a connecting stiffening member adjacent the forward portion thereof, the remaining forward portion of the blade being formed of resinous material, the whole structure being molded to bond the materials together.

A further object of the invention is to provide a method of manufacturing a blade such as a rotary blade for a helicopter, comprising arranging in two separable mold portions a glass fiber roving over which a structural reinforcing element is positioned adjacent the trailing edge portion of the wing, arranging a connecting stiffening element to extend upright in the mold, applying a roving into position between the structural elements of each mold section, and bonding the two sections together with additional plastic at the forward edge portion to form the completed wing structure.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there are illustrated and described preferred embodiments of the invention.

In the drawings:

FIG. 1 is a fragmentary perspective view indicating the formation of an airfoil section constructed in accordance with the invention in two mold sections;

FIG. 1a is a fragmentary perspective view of a complete rotary blade or airfoil section constructed in accordance with the invention;

Figure 2:
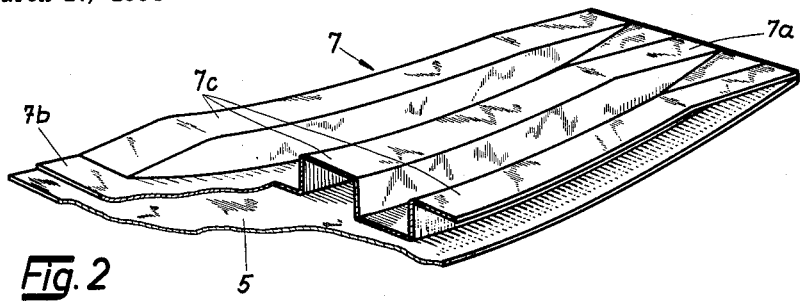
FIG. 2 is an enlarged fragmentary perspective view of a portion of the airfoil section constructed in accordance with FIG. 1.

Referring to the drawings in particular, in FIG. 1 the method of the invention is indicated as being carried out in a mold in which two half shell portions of a rotor blade generally designated 1 and 2 are formed in corresponding mold parts 3 and 4. The production of the rotor blade generally designated 20, indicated in FIG. 1a, is carried out as follows:

A glass fiber fabric layer 5 is arranged in the lower part of the mold 3 and a glass fiber fabric layer 6 is arranged in the upper mold 4. Each of the glass fiber layers is saturated with synthetic resin and they form the outer skin of the rotor blade 20. The reinforcing fibers in the glass fiber fabric layers 5 and 6 are arranged to cross at an angle of 45° in respect to the longitudinal axis of the blade. The layers 5 and 6 extend along the complete length of the blade profile. On the fabric layers 5 and 6, respectively, of each half of the blade profile is then positioned a one part stiffening element 7 and 8. The stiffening elements 7 and 8 are advantageously made of a light weight metal material and are of a size to conform to the blade length which is required. The stiffening elements form the trailing portion of the finished wing frame structure. The stiffening elements may also advantageously be made of a pre-fabricated and hardened glass fiber reinforced synthetic resin with the fibers arranged to extend substantially at an angle of 45° in respect to the longitudinal axis of the wave portions or corrugations 7c and 8c, respectively. The stiffening elements 7 and 8 with their wave or corrugation portions 7c and 8c are cemented to the outer skin 5 and 6 in a known manner such as by heat sealing.

The forward or leading edge portion of the blades is formed with glass fibrous rovings 9 and 10 which are saturated with synthetic resin and bonded to the fabric layers 5 and 6 in a number and arrangement corresponding to the distribution of the blade material. Before the rovings 9 and 10 are applied and during this stage of manufacture fittings 15 for connecting the rotor blade to the rotor head can be attached and joined by bonding them to the rovings in a known manner. Additional weights can also be provided to obtain the correct location of the center of gravity. In FIG. 1, a lead strand or rope 13 is indicated in position for locating the center of gravity and this is inserted to this end above the rovings 9 of the bottom half portion of the shell.

Before the two prepared rotor blade half shells 1 and 2 are joined, a glass fiber fabric band 11 saturated with synthetic resin is applied on the inwardly directed connecting surface 7a of the stiffening element 7. This ensures that the prefabricated stiffening parts are cemented together when the two mold halves are joined. An additional glass fiber roving 14 saturated with synthetic resin which extends in the longitudinal direction of the blade is attached on the rear or trailing edge of the half shell to cover the joint between the mold halves.

A prefabricated web or reinforcing element 12 extending in the longitudinal direction of the blade is made of substantially U-sectioned configuration and positioned between the reinforcing elements 7 and 8. The web 12 also includes reinforcing fibers which extend at an angle of 45° through the longitudinal axis of the blade. The web 12 is attached on the additional connecting surface 7b provided on the stiffening element 7 before the mold parts are closed. The web 12 is so dimensioned that the free legs of the U-section bear on the opposite connecting surfaces 7b and 8b, respectively, of the stiffening elements 7 and 8 after the mold is closed.

The mold halves are joined together by moving the mold portions 3 and 4 together and the parts are joined under heat and pressure to cause them to be cemented together. Thereafter the parts are permitted to harden in the mold and are subjected to a subsequent drying process with or without the supply of additional heat.

Figure 3:
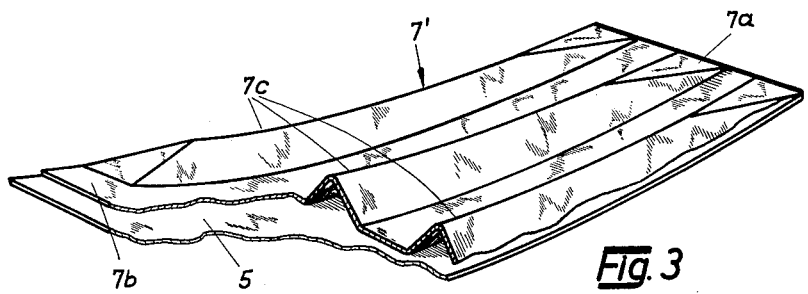
FIG. 3 is a view similar to FIG. 2 of a modified embodiment of airfoil section.
Figure 4:
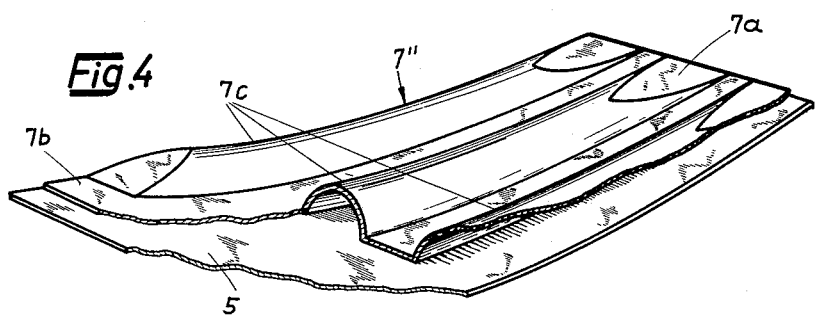
FIG. 4 is a view similar to FIG. 2 of still another embodiment of airfoil section.

As indicated in FIGS. 2, 3 and 4, the stiffening elements 7 and 8 may advantageously include various configurations. In FIG. 2, the stiffening element 7 comprises substantially rectangular corrugated portions 7c which include flattened trailing edges or surfaces 7a, which carry the fabric band 11, and a connecting surface 7b at the forward edge for carrying the web 12.

In FIG. 3 another stiffening element 7' is indicated which includes wave portions or corrugated section portions 7c formed in an angular corrugation configuration. In the embodiment of FIG. 4, the wave portions or corrugations 7c of the stiffening element 7" include rounded section formations.

While specific embodiments of the invention have been shown and described in detail to illustrate the application of the inventive principles, it will be understood that the invention may be embodied otherwise without departing from such principles.

What is claimed is:

1. A blade structure comprising a trailing portion formed of two opposed stiffening structures extending substantially the length of the blade structure, each stiffening structure having corrugations extending transverse to the longitudinal axis of the blade structure, the opposed stiffening structure having their corrugations in opposed alignment with each other, a forward portion formed of reinforced resin material bonded to said trailing portion, an outer skin formed of reinforced resin material bonded to the exterior of said forward and trailing portion, and a reinforcing web member connected between said opposed stiffening structures adjacent the forward edges thereof.

2. A blade structure comprising a trailing portion formed of two opposed stiffening structures extending substantially the length of the blade structure, each stiffening structure having corrugations extending transverse to the longitudinal axis of the blade structure, the said corrugations of said opposed structures being aligned, a forward portion formed of reinforced resin material bonded to said trailing portion, an outer skin formed of reinforced resin material bonded to the exterior of said forward and trailing portions and a web member connected between said opposed stiffening structures adjacent the forward edges thereof, said stiffening structures each having planar connecting surfaces formed adjacent the trailing edges thereof, and a band of reinforced resin material positioned between said planar surfaces of said stiffening structures.

3. A blade structure comprising a trailing portion formed of two opposed stiffening structures extending substantially the length of the blade structure, each stiffening structure having corrugations extending transverse to the longitudinal axis of the blade structure, the said corrugations of said opposed structures being aligned, a forward portion formed of reinforced resin material bonded to said trailing portion, an outer skin formed of reinforced resin material bonded to the exterior of said forward and trailing portions, a web member connected between said stiffening structures adjacent the forward edges thereof, said web member being substantially U-sectioned and with leg portions at each end, said leg portions being bonded to the forward edges of respective ones of said stiffening members.

4. A blade structure comprising a trailing portion formed of two opposed stiffening structures extending substantially the length of the blade structure, each stiffening structure having corrugations extending transverse to the longitudinal axis of the blade structure and with respective corrugations of each structure aligned, a forward portion formed of reinforced resin material bonded to said trailing portion, a channel-shaped reinforcing web member connected between said stiffening structures, and an outer skin formed of reinforced resin material bonded to the exterior of said forward and trailing portions, said reinforced resin material including fibres oriented approximately at 45° to the longitudinal axis of said blade structure.

5. A blade structure according to claim 4, wherein said corrugations are formed of a rectangular configuration.

6. A blade structure according to claim 4, wherein said corrugations are of an angular corrugated configuration.

7. A blade structure according to claim 4, wherein said corrugations are of a rounded wave configuration.

8. A blade structure comprising a trailing portion formed of two opposed stiffening structures extending substantially the length of the blade structure, each stiffening structure having corrugations extending transverse to the longitudinal axis of the blade structure and with respective corrugations of each structure aligned, a forward portion formed of reinforced resin material bonded to said trailing portion, a channel-shaped reinforcing web member connected between said stiffening structures, and an outer skin formed of reinforced resin material bonded to the exterior of said forward and trailing portions, said reinforced resin material including fibres oriented approximately at 45° to the longitudinal axis of said blade structure, said forward portion including a weight embedded therein for locating the center of gravity of said wing structure.

References Cited by the Examiner

UNITED STATES PATENTS

| | | | |
|---|---|---|---|
| 482,088 | 9/1892 | Hille | 156—245 |
| 1,146,413 | 7/1915 | Edison | 156—245 |
| 1,554,326 | 9/1925 | Black | 244—123 |
| 1,808,842 | 6/1931 | Fedor | 244—123 |
| 2,588,570 | 3/1952 | Pitcairn | 170—159 |
| 2,842,214 | 7/1958 | Prewitt | 170—135.4 |
| 3,055,437 | 9/1962 | Stack | 170—159 |

FOREIGN PATENTS 619,694  3/1949  Great Britain.

JULIUS E. WEST, *Primary Examiner.*